United States Patent [19]

Katoh et al.

[11] Patent Number: 5,412,945
[45] Date of Patent: May 9, 1995

[54] EXHAUST PURIFICATION DEVICE OF AN INTERNAL COMBUSTION ENGINE

[75] Inventors: Kenji Katoh, Shizuoka; Tokuta Inoue; Hidetaka Nohira, both of Mishima; Kiyoshi Nakanishi, Susono; Satoshi Iguchi, Mishima; Tetsuro Kihara, Susono; Hideaki Muraki, Nagoya, all of Japan

[73] Assignees: Kabushiki Kaisha Toyota Cho Kenkusho; Toyota Jidosha Kabushiki Kaisha, both of Aichi, Japan

[21] Appl. No.: 107,829
[22] PCT Filed: Dec. 25, 1992
[86] PCT No.: PCT/JP92/01710
  § 371 Date: Aug. 26, 1993
  § 102(e) Date: Aug. 26, 1993
[87] PCT Pub. No.: WO93/12863
  PCT Pub. Date: Jul. 8, 1993

[30] Foreign Application Priority Data

Dec. 27, 1991 [JP] Japan .................. 3-358125

[51] Int. Cl.6 .............................. F01N 3/28
[52] U.S. Cl. ........................ 60/285; 60/286; 60/297; 60/301; 423/213.7
[58] Field of Search .......... 60/274, 285, 286, 301, 60/297; 423/213.5, 213.7

[56] References Cited

U.S. PATENT DOCUMENTS

| | | |
|---|---|---|
| 3,795,730 | 3/1974 | Kalvinskas . |
| 3,926,590 | 12/1975 | Aibe et al. . |
| 4,760,044 | 7/1988 | Joy, III et al. . |
| 4,780,447 | 10/1988 | Kim et al. . |
| 4,868,148 | 9/1989 | Henk et al. . |
| 5,041,407 | 8/1991 | Williamson et al. . |
| 5,116,800 | 5/1992 | Williamson et al. . |
| 5,174,111 | 12/1992 | Nomura ................. 60/285 |
| 5,270,024 | 12/1993 | Kasahara ............ 423/213.5 |

FOREIGN PATENT DOCUMENTS

| | | |
|---|---|---|
| 0503882 | 3/1992 | European Pat. Off. . |
| 62-97630 | 5/1987 | Japan . |
| 62-106826 | 5/1987 | Japan . |
| 62-117620 | 5/1987 | Japan . |
| 3-135417 | 6/1991 | Japan . |

OTHER PUBLICATIONS

NO Removal by Absorption into BaO-CuO Binary Oxides, Masato Machida, et al., J. Chem. Soc., Chem. Commun., 1990, pp. 1165-1166.
Formation and Decomposition of $BaCuO_{2.5}$ Prepared from a Mixture of Nitrates, Masato Machida, et al., Journal of Solid State Chemistry, 1991, pp. 176-179.
NO Removal by Absorption into Ba-Cu-O Binary Oxides, Masato Machida, et al., Catalyst, vol. 33, No. 2, pp. 87-90.

*Primary Examiner*—Douglas Hart
*Attorney, Agent, or Firm*—Kenyon & Kenyon

[57] ABSTRACT

A $NO_x$ absorbent (18) which absorbs the $NO_x$ when the air-fuel ratio of the exhaust gas flowing into the $NO_x$ absorbent (18) is lean and releases the absorbed $NO_x$ when the oxygen concentration of the exhaust gas flowing into the $NO_x$ absorbent (18) is lowered, is arranged in the exhaust passage of the engine. The amount of alkali metals, alkali-earth metals or rare-earth metals contained in the $NO_x$ absorbent (18) positioned on the downstream side, is made lower than the amount of alkali metals, alkali-earth metals or rare-earth metals contained in the $NO_x$ absorbent (18) positioned on the upstream side, to increase a reducing ability of the $NO_x$ absorbent (18) positioned on the downstream side as compared to the reducing ability of the $NO_x$ absorbent (18) positioned on the upstream side.

28 Claims, 9 Drawing Sheets

Fig.12

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

A diesel engine, in which an engine exhaust passage is branched to a pair of exhaust branch passages for purifying $NO_x$, containing a switching valve which is disposed at the branching portion of the exhaust branch passages to alternately guide the exhaust gas to one of the exhaust branch passages by a switching function of the switching valve, and a catalyst which can oxidize and absorb the $NO_x$ and which is disposed in each of the exhaust branch passages, is well known (refer to Japanese Unexamined Patent Publication No. 62-106826). In this diesel engine, $NO_x$ in the exhaust gas introduced into one exhaust branch passage is oxidized and absorbed by the catalyst disposed in that exhaust branch passage. During this time, the inflow of the exhaust gas to the other exhaust branch passage is stopped and, at the same time, a gaseous reducing agent is fed into this exhaust branch passage. The $NO_x$ accumulated in the catalyst disposed in this exhaust branch passage is reduced by this reducing agent. Subsequently, after a short time, the introduction of the exhaust gas to the exhaust branch passage to which the exhaust gas had been introduced heretofore is stopped by the switching function of the switching valve, and the introduction of the exhaust gas to the exhaust branch passage to which the introduction of the exhaust gas had been stopped heretofore is started again.

In such a catalyst, to properly oxidize and absorb $NO_x$, it is necessary to increase the amount of alkali metals, alkali-earth metals or rare-earth metals to more than a given amount. However, if the amount of alkali metals, alkali-earth metals or rare-earth metals is increased, the alkalinity is increased and, as a result, the reducing force of the catalyst is weakened. Accordingly, when $NO_x$ absorbed in the $NO_x$ absorbent should be reduced, $NO_x$ cannot be sufficiently reduced, and thus a problem arises in that a large amount of $NO_x$ is discharged into the outside air without being reduced.

DISCLOSURE OF THE INVENTION

An object of the present invention is to provide an exhaust purification device of an internal combustion engine, which prevents $NO_x$, discharged from the internal combustion engine, from being discharged into the outside air.

According to the present invention, there is provided an exhaust purification device of an internal combustion engine wherein an $NO_x$ absorbent which absorbs $NO_x$ when an air-fuel ratio of an inflowing exhaust gas is lean and releases an absorbed $NO_x$ when the oxygen concentration of the inflowing exhaust gas is lowered is arranged in an exhaust passage of the engine, and an amount of alkali metals, alkali-earth metals or rare-earth metals, contained in the $NO_x$ absorbent positioned on the downstream side, is made lower than an amount of alkali metals, alkali-earth metals or rare-earth metals, contained in the $NO_x$ absorbent positioned on the upstream side, to increase the reducing power of the $NO_x$ absorbent positioned on the downstream side as compared to a reducing power of the $NO_x$ absorbent positioned on the upstream side, $NO_x$ absorbed in the $NO_x$ absorbent being released from the $NO_x$ absorbent when the oxygen concentration of the exhaust gas flowing into $NO_x$ absorbent is lowered.

BEST MODE FOR CARRYING OUT THE INVENTION

Figure 1:
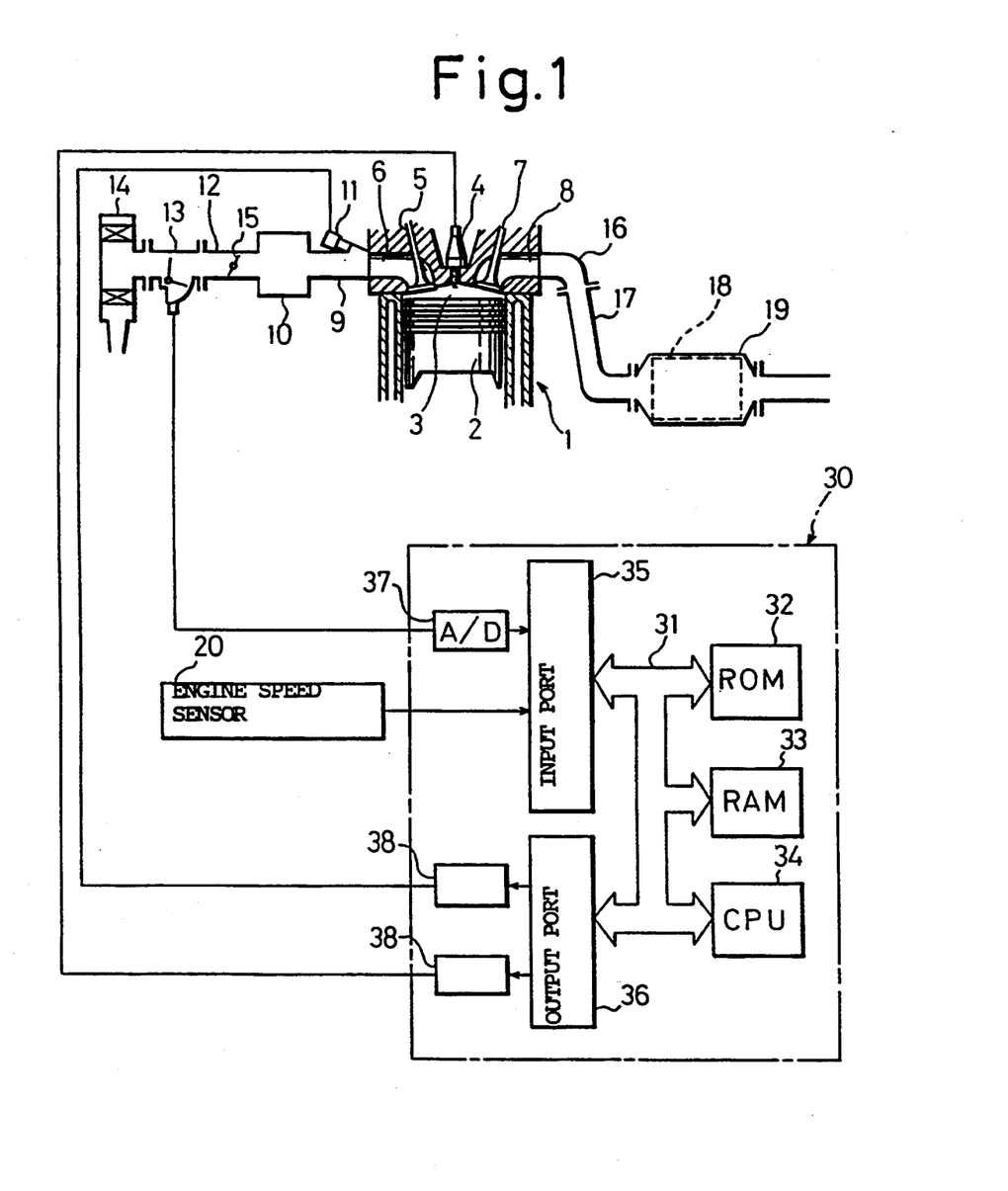
FIG. 1 is an overall view of an internal combustion engine.

FIG. 1 shows a case where the present invention is applied to a gasoline engine.

Referring to FIG. 1, 1 denotes an engine body; 2 a piston; 3 a combustion chamber; 4 a spark plug; 5 an intake valve; 6 an intake port; 7 an exhaust valve; and 8 an exhaust port, respectively. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 14 via an intake duct 12 and an air flow meter 13, and a throttle valve 15 is disposed in the intake duct 12. On the other hand, the exhaust port 8 is connected via an exhaust manifold 16 and an exhaust pipe 17 to a casing 19 including the $NO_x$ absorbent 18 therein.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. The air flow meter 13 generates an output voltage proportional to the amount of intake air, and this output voltage is input via an AD converter 37 to the input port 35. Also, an engine speed sensor 20 generating an output pulse expressing the engine speed is connected to the input port 35. On the other hand, the output port 36 is connected via the corresponding driving circuits 38 to the spark plug 4 and fuel injector 11, respectively.

In the internal combustion engine shown in FIG. 1, the fuel injection time TAU is calculated based on for example the following equation.

Figure 4:
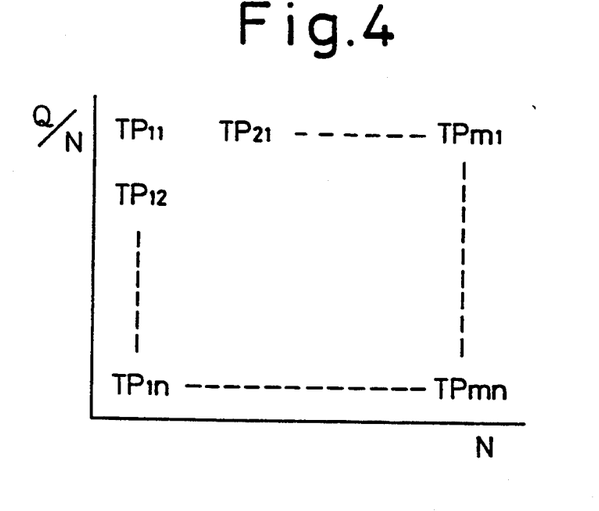
FIG. 4 is a diagram showing a map of a basic fuel injection time.

TAU=TP.K where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiments and is stored in advance in the ROM 32 in the form of a map as shown in FIG. 4 as the function of an engine load Q/N (intake air amount Q/engine speed N) and the engine speed N. The correction coefficient K is a coefficient for controlling the air-fuel ratio of the air-fuel mixture fed into the engine cylinder, and if K=1.0, the air-fuel ratio of the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 5:
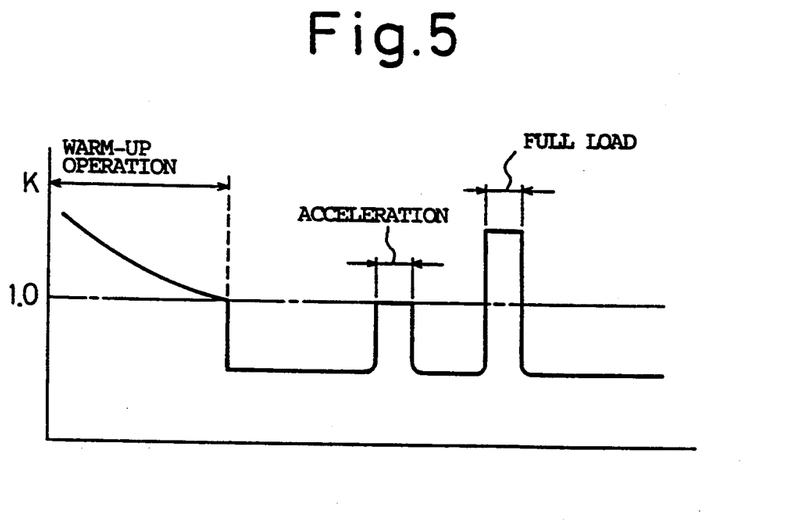
FIG. 5 is a diagram showing a change of a correction coefficient K.

This correction coefficient K is controlled in accordance with the operating state of the engine. FIG. 5 shows one embodiment of the control of this correction coefficient K. In the embodiment shown in FIG. 5, during a warm-up operation, the correction coefficient K is gradually lowered as the engine cooling water temperature becomes higher. When the warm-up is completed, the correction coefficient K is maintained at a constant value smaller than 1.0, that is, the air-fuel ratio of the air-fuel mixture fed into the engine cylinder is kept lean. Subsequently, when an acceleration operation is carried out, the correction coefficient K is brought to, for example, 1.0, that is, the air-fuel ratio of the air-fuel mixture fed into the engine cylinder is brought to the stoichiometric air-fuel ratio. When a full load operation is carried out, the correction coefficient K is made larger than 1.0. Namely, the air-fuel ratio of the air-fuel mixture fed into the engine cylinder is made rich. As seen from FIG. 5, in the embodiment shown in FIG. 5, except for the time of the warm-up operation, the time of the acceleration operation, and the time of the full load operation, the air-fuel ratio of the air-fuel mixture fed into the engine cylinder is maintained at a constant lean air-fuel ratio, and accordingly the lean air-fuel mixture is burned in a majority of the engine operation region.

Figure 6:
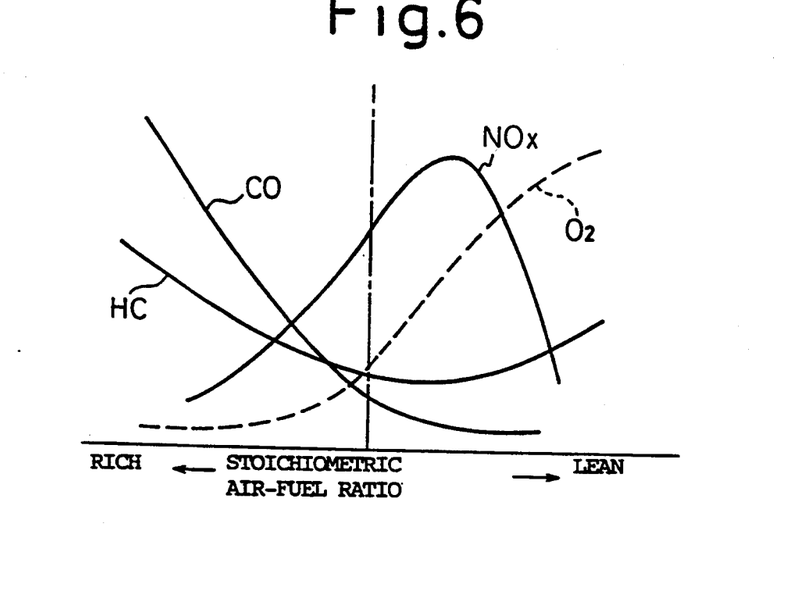
FIG. 6 is a graph schematically showing the concentration of unburnt HC and CO and oxygen in the exhaust gas discharged from the engine.

FIG. 6 schematically shows the concentration of representative components in the exhaust gas discharged from the combustion chamber 3. As seen from FIG. 6, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 18 contained in the casing 19 uses, for example, alumina as a carrier. On this carrier, at least one substance selected from alkali metals, for example, potassium K, sodium Na, lithium Li, and cesium Cs; alkali-earth metals, for example, barium Ba, magnesium Mg and calcium Ca; rare-earth metals, for example, lanthanum La, cerium Ce, neodymium Nd and yttrium Y; and precious metals such as platinum Pt, is carried. When referring to the ratio between the air and fuel (hydrocarbons) fed into the intake passage of the engine and the exhaust passage upstream of the $NO_x$ absorbent 18 as the air-fuel ratio of the inflowing exhaust gas to the $NO_x$ absorbent 18, this $NO_x$ absorbent 18 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where an additional fuel (hydrocarbons) or air is not fed into the exhaust passage upstream of the $NO_x$ absorbent 18, the air-fuel ratio of the inflowing exhaust gas coincides with the air-fuel ratio of the air-fuel mixture fed into the combustion chamber 3, and accordingly in this case, the $NO_x$ absorbent 18 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

When the above-mentioned $NO_x$ absorbent 18 is disposed in the exhaust passage of the engine, this $NO_x$ absorbent 18 actually performs the absorption and releasing operation of $NO_x$, but there are areas of the exact mechanism of this absorption and releasing operation which are not clear. However, it can be considered that this absorption and releasing operation is conducted by the mechanism as shown in FIG. 7. This mechanism will be explained by using as an example a case where platinum Pt and barium Ba are carried on the carrier, but a similar mechanism is obtained even if other precious metals, alkali metals, alkali-earth metals, or rare-earth metals are used.

Figure 7A:
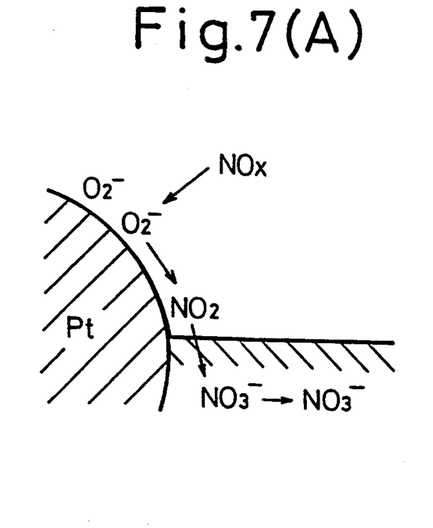
FIG. 7 is a diagram for explaining the absorbing and releasing operation of the $NO_x$.

Namely, when the inflowing exhaust gas becomes considerably lean, the concentration of oxygen in the inflow of exhaust gas is greatly increased. As shown in FIG. 7(A), the oxygen $O_2$ is deposited on the surface of the platinum Pt in the form of $O_2^-$ or $O^{2-}$. On the other , hand, the NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 7(A). In this way, $NO_x$ is absorbed into the $NO_x$ absorbent 18.

So long as the oxygen concentration in the inflowing exhaust gas is high, the $NO_2$ is produced on the surface of the platinum Pt, and so long as the $NO_x$ absorption ability of the absorbent is not saturated, the $NO_2$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid , ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 18. As shown in FIG. 6, when the degree of leanness of the inflow of exhaust gas becomes low, the oxygen concentration in the inflowing exhaust gas is lowered, and accordingly when the degree of leanness of the inflowing exhaust gas is lowered, the $NO_x$ is released from $NO_x$ absorbent 18 even if the air-fuel ratio of the inflowing exhaust gas is lean.

Figure 7B:
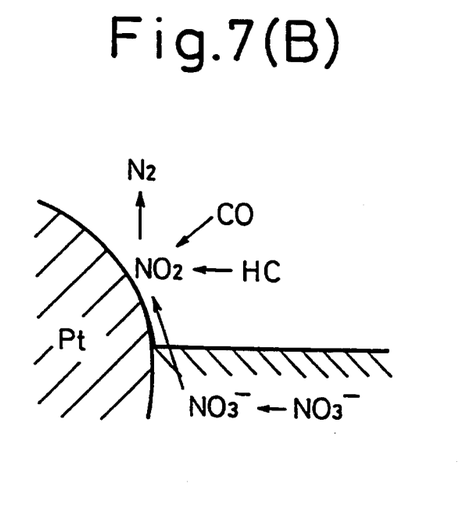

On the other hand, at this time, when the air-fuel ratio of the air-fuel mixture fed into the combustion chamber 3 is made rich and the air-fuel ratio of the inflowing exhaust gas becomes rich, as shown in FIG. 6, a large amount of unburnt HC and CO is discharged from the engine, and these unburnt HC and CO react with the oxygen $O_2^-$ or $O^{2-}$ on the platinum Pt and are oxidized. Also, when the air-fuel ratio of the inflowing exhaust gas becomes rich, the oxygen concentration in the inflow of exhaust gas is reduced, and therefore the $NO_2$ is released from the absorbent. This $NO_2$ reacts with the unburnt HC and CO as shown in FIG. 7(B) and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 18 in a short time.

Namely, when the air-fuel ratio of the inflowing exhaust gas is made rich, first of all, the unburnt HC and CO immediately react with the $O_2^-$ or $O^{2-}$ on the platinum Pt and are oxidized, and subsequently if the unburnt HC and CO still remain even though the $O_2^-$ or $O^{2-}$ on the platinum Pt is consumed, the $NO_x$ released from the absorbent and the $NO_x$ discharged from the engine are reduced by these unburnt HC and CO. Accordingly, when the air-fuel ratio of the inflowing exhaust gas is made rich, the $NO_x$ absorbed in the $NO_x$ absorbent 18 is released in a short time and in addition this released $NO_x$ is reduced. Also, since the $NO_x$ absorbent 18 has the function of a reduction catalyst, even if the air-fuel ratio of the inflowing exhaust gas is made the stoichiometric air-fuel ratio, the $NO_x$ released from the $NO_x$ absorbent 18 can be reduced. However, where the air-fuel ratio of the inflowing exhaust gas is made the stoichiometric air-fuel ratio, the NOx is released only gradually from the $NO_x$ absorbent 18, and therefore a slightly longer time is required for releasing all $NO_x$ absorbed in the $NO_x$ absorbent 18.

As mentioned above, the $NO_x$ absorbent 18 has a function such that it absorbs $NO_x$ when the air-fuel ratio of the inflowing exhaust gas is lean, and that the $NO_x$ absorbent 18 releases $NO_x$ and reduces the released $NO_x$ when the air-fuel ratio of the inflowing exhaust gas becomes the stoichiometric air-fuel ratio or rich. However, the absorbing ability of $NO_x$ and a reducing ability of the released $NO_x$ vary in accordance with the amount of alkali metals, alkali-earth metals or rare-earth metals carried on the $NO_x$ absorbent 18.

As mentioned above, at least one substance selected from alkali metals, for example, potassium K, sodium Na, lithium Li, and cesium Cs; alkali-earth metals, for example, barium Ba and calcium Ca; rare-earth metals, for example, lanthanum La and yttrium Y; and precious metals such as platinum Pt, is carried on the carrier of the $NO_x$ absorbent 18. Also as mentioned above, $NO_x$ is absorbed in the absorbent in such a way that $NO_x$ is diffused in the absorbent while bonding with oxides of alkali metals, alkali-earth metals or rare-earth metals. Accordingly, to properly absorb $NO_x$ in the absorbent, it is necessary that the amount of at least one substance selected from alkali metals, alkali-earth metals or rare-earth metals, carried on the carrier, is more than a given amount. In this regard, where a monolithic carrier made of alumina is used, it has proven that, if the amount of at least one substance selected from the above-mentioned alkali metals, alkali-earth metals or rare-earth metals, carried on the carrier, is more than 0.03 mol per 1 l of the volume of the monolithic carrier, $NO_x$ is properly absorbed in the absorbent. In this case, to obtain a further proper absorbing operation of $NO_x$, it is preferable that the amount of at least one substance selected from the above-mentioned alkali metals, alkali-earth metals or rare-earth metals, carried on the carrier, be between 0.1 mol to 0.3 mol per 1 l of the volume of the monolithic carrier.

However, if the amount of these alkali metals, alkali-earth metals or rare-earth metals is increased, since the alkalinity is increased, a reducing force of $NO_x$ is weakened when reducing $NO_x$ released from the $NO_x$ absorbent 18. Accordingly, if the amount of at least one substance of the above-mentioned alkali metals, alkali-earth metals or rare-earth metals is made larger than 0.03 mol per 1 l of the volume of the monolithic carrier to obtain a food absorbing operation of $NO_x$ as mentioned above, when $NO_x$ is released, the $NO_x$ thus released cannot be properly reduced.

In this case, if the amount of at least one substance selected from the above-mentioned alkali metals, alkali-earth metals or rare-earth metals is lowered below 0.01 mol per 1 l of the volume of the monolithic carrier, the absorbing ability of $NO_x$ is lowered, but the reducing ability of the $NO_x$ absorbent 18 is considerably improved. In addition, if the $NO_x$ absorbent 18 is formed so that it does not contain these alkalis metals, alkali-earth metals and rare-earth metals at all, the reducing force of the $NO_x$ absorbent 18 is strengthened.

Figure 2:
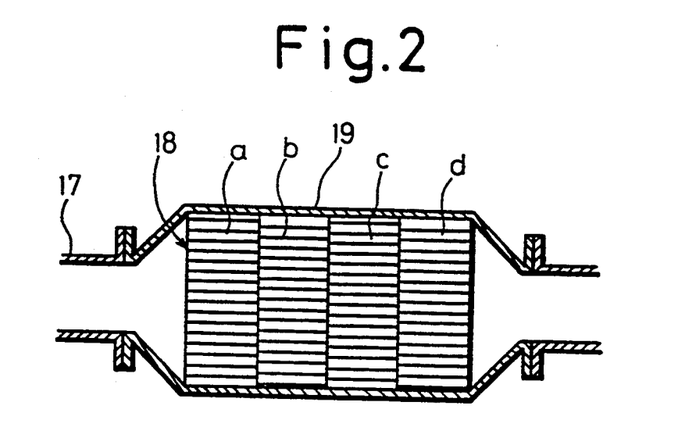
FIG. 2 is an enlarged cross-sectional side view illustrating a first embodiment of an $NO_x$ absorbent.

Therefore, in the embodiment according to the present invention, as illustrated in FIG. 2, the $NO_x$ absorbent 18 is formed by a single monolithic carrier, and this monolithic carrier is divided into a plurality of regions a, b, c, d from the upstream side toward the downstream side. And, the amount of at least one substance selected from alkali metals, alkali-earth metals and rare-earth metals is made smaller from the region a toward the region d. Namely, in the region a, the amount of one substance selected from alkali metals, alkali-earth metals or rare-earth metals is made between 0.1 mol to 0.3 mol per 1 l of the volume of the monolithic carrier and, in the region d, the amount of at least one substance selected from alkali metals, alkali-earth metals or rare-earth metals is made below 0.01 mol per 1 of the volume of the monolithic carrier. In the regions b and d, the amount of at least one substance selected from alkali metals, alkali-earth metals or rare-earth metals is made between the amounts of the regions a and d.

Figure 3:
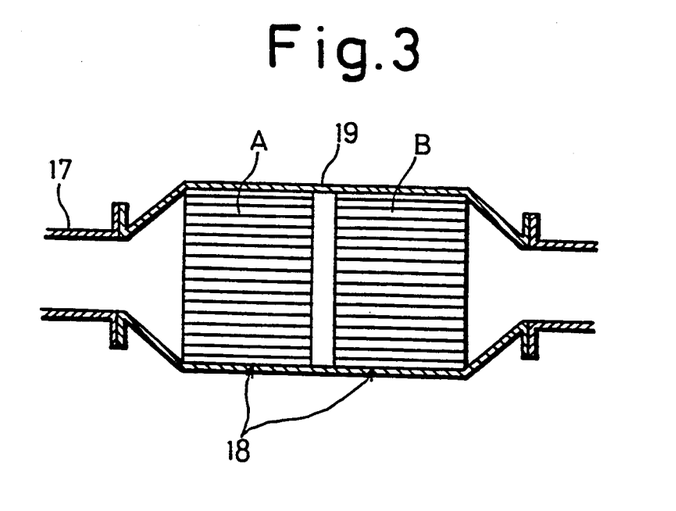
FIG. 3 is an enlarged cross-sectional side view illustrating a second embodiment of an $NO_x$ absorbent.

In the embodiment illustrated in FIG. 3, the $NO_x$ absorbent 18 comprises a pair of spaced monolithic carriers A and B. In the monolithic carrier A located on the upstream side, the amount of at least one substance selected from alkali metals, alkali-earth metals or rare-earth metals is made more than 0.03 mol per 1 l of the volume of the monolithic carrier and, in the monolithic carrier B located on the downstream side, the amount of at least one substance selected from alkali metals, alkali-earth metals or rare-earth metals is made below 0.01 mol per 1 l of the volume of the monolithic carrier.

If the $NO_x$ absorbent 18 is formed as illustrated in FIG. 2 or 3, the $NO_x$ absorbent 18 located on the upstream side has a high absorbing ability of $NO_x$, and the reducing ability of the $NO_x$ absorbent 18 located on the downstream side is improved. Accordingly, in the embodiments illustrated in FIGS. 2 and 3, when a lean air-fuel mixture is burned, $NO_x$ is mainly absorbed in the $NO_x$ absorbent 18 located on the upstream side. When the air-fuel ratio of the exhaust gas flowing into the $NO_x$ absorbent 18 is made the stoichiometric air-fuel ratio or rich to release $NO_x$ from the $NO_x$ absorbent 18, $NO_x$ is mainly released from the $NO_x$ absorbent 18 located on the upstream side, and $NO_x$ thus released is mainly reduced by the $NO_x$ absorbent 18 located on the downstream side. Therefore, when $NO_x$ is released from the $NO_x$ absorbent 18, it is possible to prevent $NO_x$ from being discharged into the outside air.

As mentioned earlier, when the degree of leanness of the inflowing exhaust gas is lowered, even if the air-fuel ratio of the inflowing exhaust gas is lean, the $NO_x$ is released from the $NO_x$ absorbent 18. Accordingly, to release the $NO_x$ from the $NO_x$ absorbent 18, it is satisfactory if the concentration of oxygen in the inflowing exhaust gas is lowered. Note, even if the $NO_x$ is released from the $NO_x$ absorbent 18, when the air-fuel ratio of the inflowing exhaust gas is lean, the $NO_x$ is not reduced in the $NO_x$ absorbent 18, and accordingly, in this case, it is necessary to provide a catalyst which can reduce the $NO_x$ downstream of the $NO_x$ absorbent 18 or supply a reducing agent downstream of the $NO_x$ absorbent 18. Of course, it is also possible to reduce the $NO_x$ downstream of the $NO_x$ absorbent 18 in this way, but it is rather preferable that the $NO_x$ be reduced in the $NO_x$ absorbent 18. Accordingly, in the embodiment according to the present invention, when the $NO_x$ should be released from the $NO_x$ absorbent 18, the air-fuel ratio of the inflowing exhaust gas is made the stoichiometric air-fuel ratio or rich, whereby the $NO_x$ released from the $NO_x$ absorbent 18 is reduced in the $NO_x$ absorbent 18.

Figure 8A:
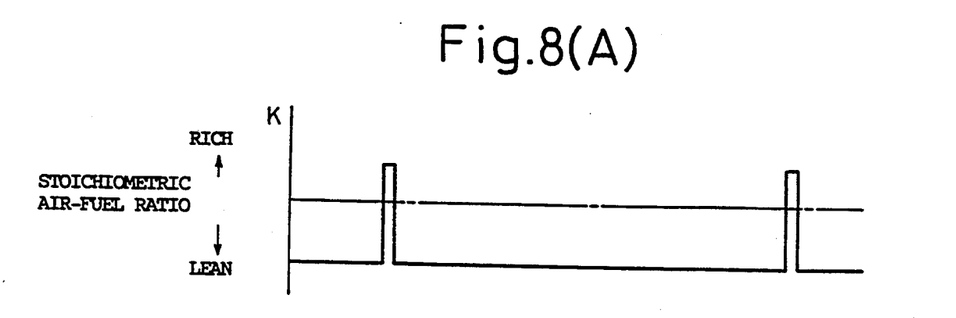
FIG. 8 is a diagram showing a timing of a $NO_x$ releasing control.
Figure 8B:
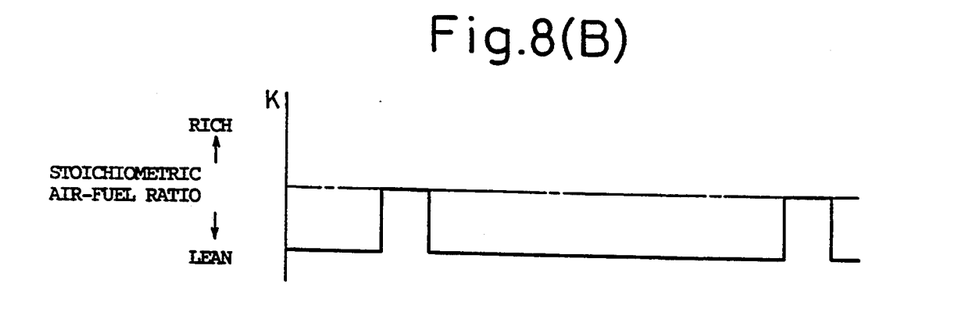

In the embodiments according to the present invention, as mentioned above, the air-fuel ratio of the air-fuel mixture fed into the combustion chamber 3 is made rich at the time of the full load operation, and that of the air-fuel mixture is made the stoichiometric air-fuel ratio at the time of the acceleration operation, and therefore $NO_x$ is released from the $NO_x$ absorbent 18 at the time of the full load operation and at the time of the acceleration operation. However, when the frequency of such a full load operation or acceleration operation is low, even if the $NO_x$ is released from the $NO_x$ absorbent 18 only at the time of the full load operation and acceleration operation, the absorption ability of the $NO_x$ by the $NO_x$ absorbent 18 is saturated during the period where the lean air-fuel mixture is burned, and thus the $NO_x$ is no longer absorbed by the $NO_x$ absorbent 18. Accordingly, in the embodiment according to the present invention, when the lean air-fuel mixture is continuously burned, as shown in FIG. 8(A), the air-fuel ratio of the inflowing exhaust gas is periodically made rich, or the air-fuel ratio of the inflowing exhaust gas is periodically made the stoichiometric air-fuel ratio as shown in FIG. 8(B).

The releasing operation of the $NO_x$ from the $NO_x$ absorbent 18 is carried out when a constant amount of $NO_x$ is absorbed into the $NO_x$ absorbent 18, for example when $NO_x$ of 50% of the absorption ability of the $NO_x$ absorbent 18 is absorbed. The amount of $NO_x$ absorbed into the $NO_x$ absorbent 18 is proportional to the amount of the exhaust gas discharged from the engine and the $NO_x$ concentration in the exhaust gas. In this case, the amount of the exhaust gas is proportional to the intake air amount, and the $NO_x$ concentration in the exhaust gas is proportional to the engine load, and therefore the amount of $NO_x$ absorbed into the $NO_x$ absorbent 18 is correctly proportional to the amount of intake air and the engine load. Accordingly, the amount of the $NO_x$ absorbed in the $NO_x$ absorbent 18 can be estimated from the cumulative value of the product of the amount of the intake air with the engine load, but in the embodiment according to the present invention, it is simplified and the amount of $NO_x$ absorbed in the $NO_x$ absorbent 18 is estimated from the cumulative value of the engine speed.

An explanation will be made next of one embodiment of absorption and releasing control of the $NO_x$ absorbent 18 according to the present invention with reference to FIG. 9 and FIG. 10.

Figure 9:
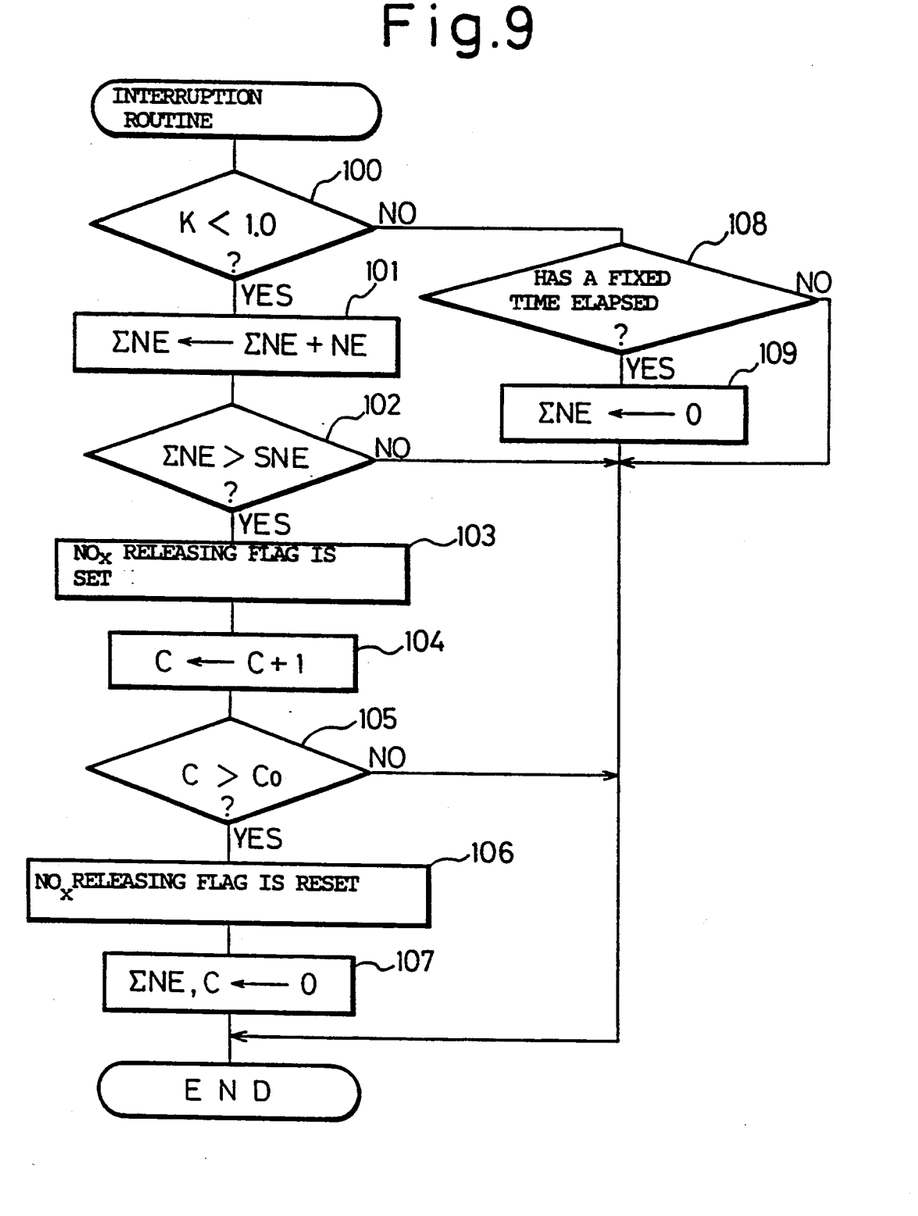
FIG. 9 is a flow chart showing an interruption routine.

FIG. 9 shows an interruption routine executed at predetermined time intervals.

Referring to FIG. 9, first, it is judged at step 100 whether or not the correction coefficient K with respect to the basic fuel injection time TP is smaller than 1.0, that is, whether or not the lean air-fuel mixture has been burned. When $K<1.0$, that is, when the lean air-fuel mixture has been burned, the processing routine goes to step 101, at which the result of addition of $\Sigma NE$ to the current engine speed NE is defined as $\Sigma NE$. Accordingly, this $\Sigma NE$ indicates the cumulative value of the engine speed NE. Subsequently, at step 102, it is judged whether or not the cumulative engine speed $\Sigma NE$ is larger than the constant value SNE. This constant value SNE shows a cumulative engine speed from which it is estimated that $NO_x$ in an amount of for example 50% of the absorption ability of $NO_x$ is absorbed by the $NO_x$ absorbent 18. When $\Sigma NE \leq SNE$, the processing cycle is completed, and when $\Sigma NE > SNE$, that is, when it is estimated that $NO_x$ in an amount of 50% of the $NO_x$ absorption ability of the $NO_x$ absorbent 18 is absorbed therein, the processing routine goes to step 103, and the $NO_x$ releasing flag is set. When the $NO_x$ releasing flag is set, as will be mentioned later, the air-fuel ratio of the air-fuel mixture fed into the engine cylinder is made rich.

Subsequently, at step 104, the count value C is incremented by "1". Subsequently, at step 105, it is judged whether or not the count value C becomes larger than a constant value $C_0$, that is, whether or not for example five seconds have elapsed. When $C \leq C_0$, the processing routine is completed, and when C becomes larger than $C_0$, the processing routine goes to step 106, at which the $NO_x$ releasing flag is reset. When the $NO_x$ releasing flag is reset, as will be mentioned later, the air-fuel ratio of the air-fuel mixture fed into the engine cylinder is switched from rich to lean, and thus the air-fuel ratio of the air-fuel mixture fed into the engine cylinder is made rich for 5 seconds. Subsequently, at step 107, the cumulative engine speed $\Sigma NE$ and the count value C are brought to zero.

On the other hand, at step 100, when it is decided that $K \geq 1.0$, that is, when the air-fuel ratio of the air-fuel mixture fed into the engine cylinder is the stoichiometric air-fuel ratio or rich, the processing routine goes to step 108, at which it is judged whether or not the state of $K \geq 1.0$ is continued for a constant time, for example, 10 seconds. When the state of $K \geq 1.0$ is not continued for the predetermined time, the processing cycle is completed, and when the state of $K \geq 1.0$ is continued for the predetermined time, the processing routine goes to step 109, at which the cumulative engine speed $\Sigma NE$ is brought to zero.

Namely, when the time over which the air-fuel ratio of the air-fuel mixture fed into the engine cylinder is made the stoichiometric air-fuel ratio or rich is continued for about 10 seconds, it can be considered that most of the $NO_x$ absorbed in the $NO_x$ absorbent 18 was released, and accordingly in this case, the cumulative engine speed $\Sigma NE$ is brought to zero at step 109.

Figure 10:
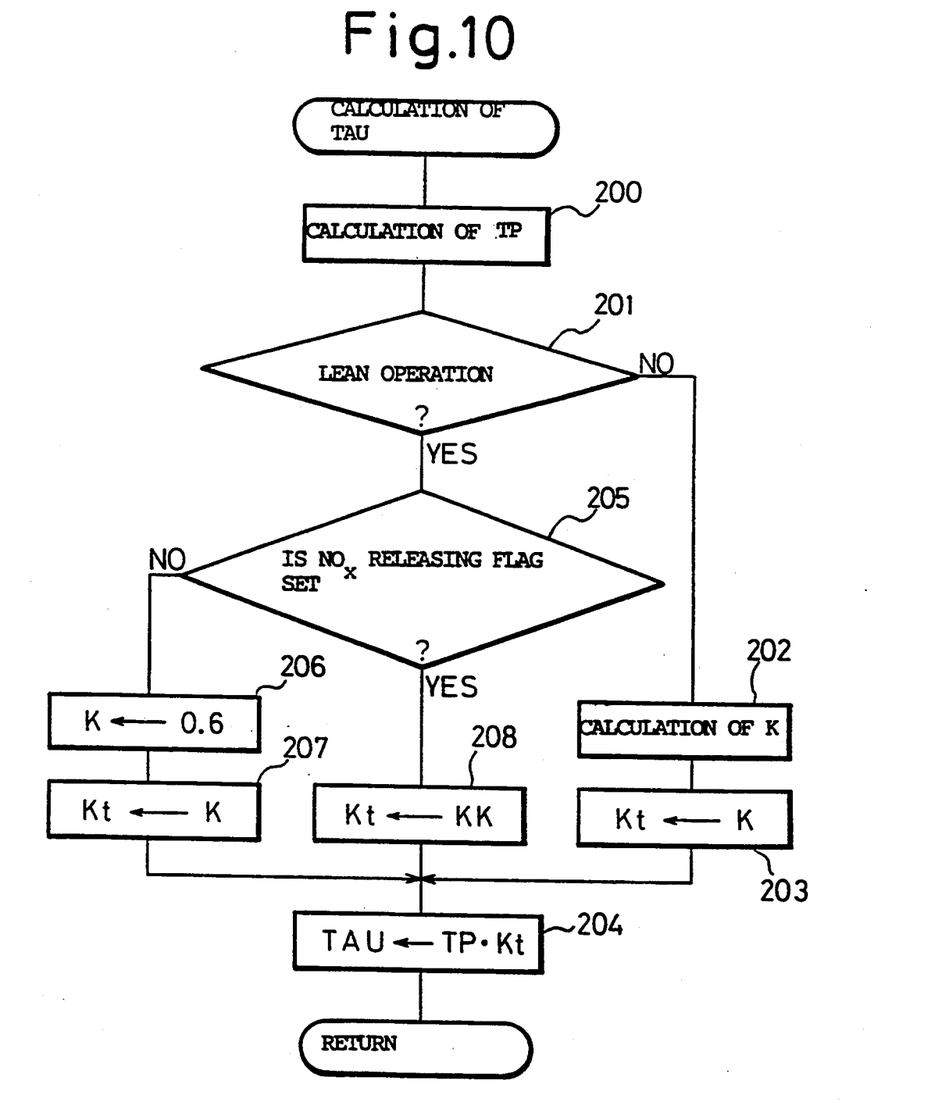
FIG. 10 is a flow chart for calculating a fuel injection time TAU.

FIG. 10 shows a calculation routine of the fuel injection time TAU. This routine is repeatedly executed.

Referring to FIG. 10, first, at step 200, a basic fuel injection time TP is calculated from a map indicated in FIG. 4. Subsequently, at step 201, it is judged whether or not the operation state is a state where combustion of the lean air-fuel mixture should be carried out. When it is not an operation state where combustion of the lean air-fuel mixture should be carried out, that is, at the time of the warm-up operation, acceleration operation, or full load operation, the processing routine goes to step 202, at which the correction coefficient K is calculated. At the time of an engine warm-up operation, this correction coefficient K is a function of the engine cooling water temperature and becomes smaller as the engine cooling water temperature becomes higher within a range indicated by $K \geq 1.0$. Also, at the time of the acceleration operation, the correction coefficient K is brought to 1.0, and at the time of the full load operation, the correction coefficient K is made a value larger than 1.0. Subsequently, at step 203, the correction coefficient K is made Kt, and subsequently, at step 204, the fuel injection time TAU (=TP.Kt) is calculated. At this time, the air-fuel ratio of the air-fuel mixture fed into the engine cylinder is made the stoichiometric air-fuel ratio or rich.

On the other hand, at step 201, when it is judged that the operation state is a state where combustion of the lean air-fuel mixture should be carried out, the processing routine goes to step 205, at which it is judged whether or not the $NO_x$ releasing flag has been set. When the $NO_x$ releasing flag has not been set, the processing routine goes to step 206, at which the correction coefficient K is made for example 0.6, and subsequently, at step 207, the correction coefficient K is changed to Kt, and then the processing routine goes to step 204. Accordingly, at this time, a lean air-fuel mixture is fed into the engine cylinder. On the other hand, when it is decided at step 205 that the $NO_x$ releasing flag was set, the processing routine goes to step 208, at which the preliminarily determined value KK is changed to Kt, and subsequently the processing routine goes to step 204. This value KK is a value of from about 1.1 to 1.2 with which the air-fuel ratio of the air-fuel mixture fed into the engine cylinder becomes about 12.0 to 13.5. Accordingly, at this time, the rich air-fuel mixture is fed into the engine cylinder, whereby the $NO_x$ absorbed in the $NO_x$ absorbent 18 is released. Note that, at the releasing of $NO_x$, where the air-fuel mixture is to be made the stoichiometric air-fuel ratio, the value of KK is brought to 1.0.

Figure 11:
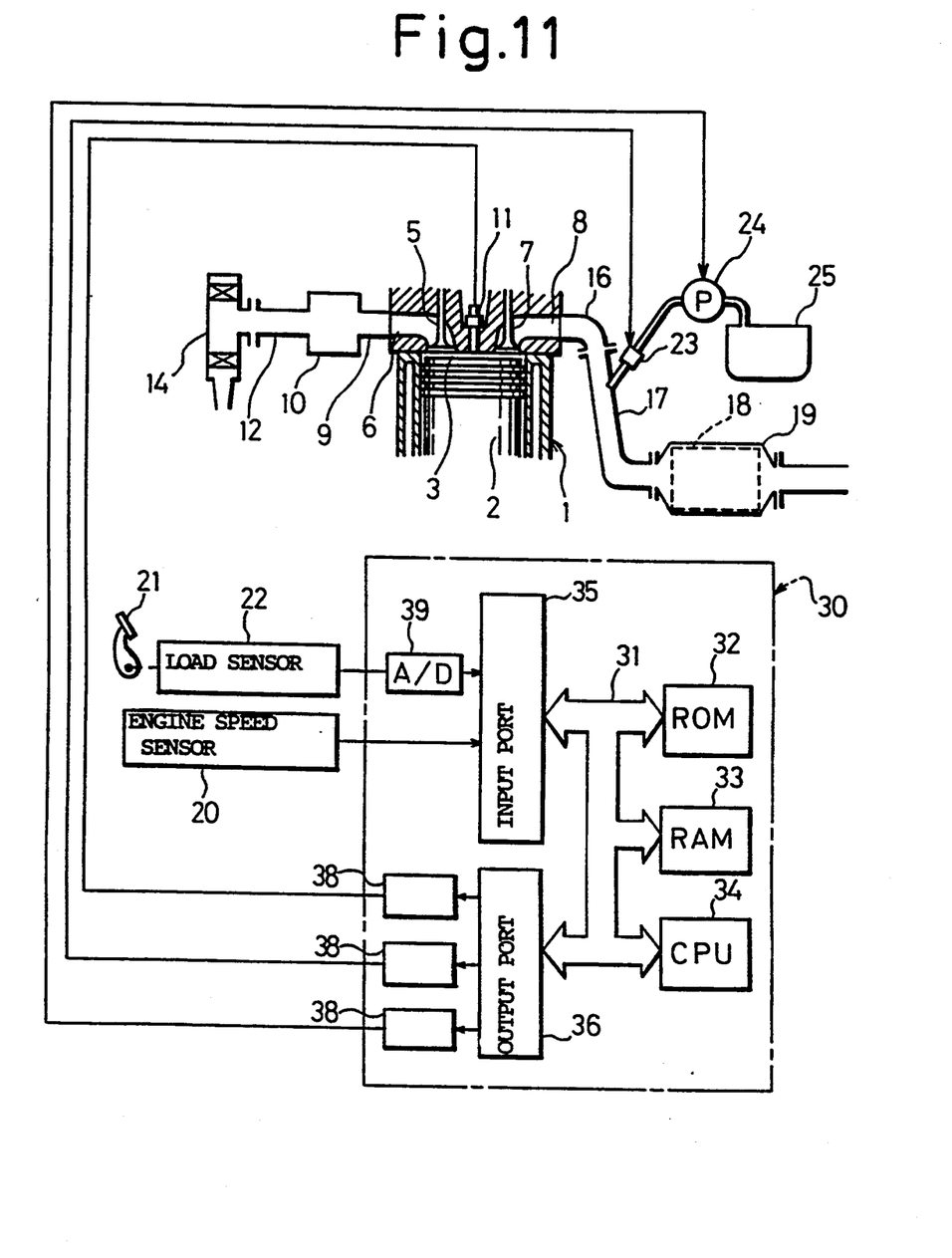
FIG. 11 is an overall view showing another embodiment of the internal combustion engine.

FIG. 11 shows a case where the present invention is applied to a diesel engine. Note that, in FIG. 11, the same constituent elements as those in FIG. 1 are shown by the same reference numerals.

In the diesel engine, usually, in all operation states, combustion is carried out in a state where the excessive air ratio is more than 1.0, that is, the average air-fuel ratio of the air-fuel mixture in the combustion chamber 3 is lean. Accordingly, the $NO_x$ discharged at this time is absorbed into the $NO_x$ absorbent 18. On the other hand, when the $NO_x$ should be released from the $NO_x$ absorbent 18, the air-fuel ratio of the inflow of exhaust gas to the $NO_x$ absorbent 18 is made rich. In this case, in the embodiment shown in FIG. 11, the average air-fuel ratio of the air-fuel mixture in the combustion chamber 3 is made lean, and the hydrocarbon is fed into the exhaust passage of engine upstream of the $NO_x$ absorbent 18, whereby the air-fuel ratio of the inflowing exhaust gas to the $NO_x$ absorbent 18 is made rich.

Referring to FIG. 11, in this embodiment, a load sensor 22 generating an output voltage proportional to the amount of depression of the accelerator pedal 21 is provided, and the output voltage of this load sensor 22 is input via the AD converter 39 to the input port 35. Also, in this embodiment, a reducing agent supply valve 23 is disposed in the exhaust pipe 17, which this reducing agent supply valve 23 is connected with a reducing agent tank 25 via a supply pump 24. The output port 36 of the electronic control unit 30 is connected to the reducing agent supply valve 23 and the supply pump 24 via the driving circuits 38, respectively. In the reducing agent tank 25, a hydrocarbon such as gasoline, isoctane, hexane, heptane, light oil, kerosine, or the like or a hydrocarbon such as butane, propane, or the like which can be stored in the state of a liquid is filled.

In this embodiment, usually the air-fuel mixture in the combustion chamber 3 is burned under an excess air state, that is, in a state where the average air-fuel ratio is lean. At this time, the $NO_x$ discharged from the engine is absorbed into the $NO_x$ absorbent 18. When the $NO_x$ should be released from the $NO_x$ absorbent 18, the supply pump 24 is driven and, at the same time, the reducing agent supply valve 23 is opened, whereby the hydrocarbon filled in the reducing agent tank 25 is supplied from the reducing agent supply valve 23 to the exhaust pipe 17 for a predetermined time, for example, about 5 seconds to 20 seconds. The amount of supply of the hydrocarbon at this time is determined so that the air-fuel ratio of the inflowing exhaust gas flowing into the $NO_x$ absorbent 18 becomes rich. Accordingly, at this time, the $NO_x$ is released from the $NO_x$ absorbent 18.

Figure 12:
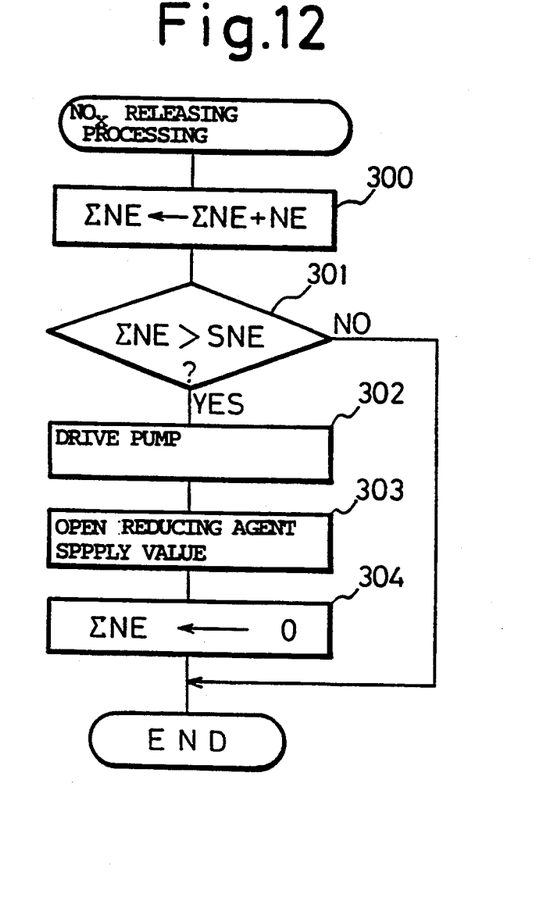
FIG. 12 is a flow chart for performing the $NO_x$ releasing processing.

FIG. 12 shows a routine for executing the $NO_x$ releasing processing, which routine is executed by interruption at every predetermined time interval.

Referring to FIG. 12, first of all, at step 300, a result obtained by adding $\Sigma NE$ to the present engine speed NE is defined as $\Sigma NE$. Accordingly, this $\Sigma NE$ indicates the cumulative value of the engine speed NE. Subsequently, at step 301, it is judged whether or not the cumulative engine speed $\Sigma NE$ is larger than the predetermined value SNE. This predetermined value SNE indicates a cumulative engine speed from which it is estimated that the $NO_x$ in an amount of, for example, 50% of the $NO_x$ absorption ability of the $NO_x$ absorbent 18 is absorbed therein. When $\Sigma NE \leq SNE$, the processing cycle is completed, and when $\Sigma NE > SNE$, that is, when it is estimated that the $NO_x$ in an amount of 50% of the $NO_x$ absorption ability of the $NO_x$ absorbent 18 is absorbed therein, the processing routine goes to step 302. At step 302, the supply pump 24 is driven for a predetermined time, for example, about 5 seconds to 20 seconds. Subsequently, at step 303, the reducing agent supply valve 23 is opened for a predetermined time, for example, about 5 seconds to 20 seconds, and subsequently, at step 304, the cumulative engine speed $\Sigma NE$ is brought to zero.

As mentioned above, according to the present invention, it is possible to properly absorb $NO_x$ in the $NO_x$ absorbent when $NO_x$ should be absorbed in the $NO_x$ absorbent, and it is possible to reduce $NO_x$ released from the $NO_x$ absorbent when $NO_x$ should be released from the $NO_x$ absorbent.

We claim:

1. An exhaust purification device of an internal combustion engine wherein an $NO_x$ absorbent which absorbs $NO_x$ when an air-fuel ratio of an inflowing exhaust gas is lean and releases absorbed $NO_x$ when the oxygen concentration of the inflowing exhaust gas is lowered is arranged in an exhaust passage of the engine, and an amount of alkali metals, alkali-earth metals or rare-earth metals, contained in the $NO_x$ absorbent positioned on the downstream side, is made lower than an amount of alkali metals, alkali-earth metals or rare-earth metals, contained in the $NO_x$ absorbent positioned on the upstream side, to improve the reducing ability of the $NO_x$ absorbent positioned on the downstream side as compared to the reducing ability of the $NO_x$ absorbent positioned on the upstream side, $NO_x$ absorbed in the $NO_x$ absorbent being released from the $NO_x$ absorbent when the oxygen concentration of the exhaust gas flowing into the $NO_x$ absorbent is reduced.

2. An exhaust purification device of an internal combustion engine according to claim 1, wherein said alkali metals comprise potassium, sodium, lithium and cesium.

3. An exhaust purification device of an internal combustion engine according to claim 1, wherein said alkali-earth metal comprises barium, magnesium and calcium.

4. An exhaust purification device of an internal combustion engine according to claim 1, wherein said rare-earth metal comprises lanthanum, cerium, neodymium and yttrium.

5. An exhaust purification device of an internal combustion engine according to claim 1, wherein said $NO_x$ absorbent contains platinum therein.

6. An exhaust purification device of an internal combustion engine according to claim 1, wherein said $NO_x$ absorbent carries said alkali metal, said alkali-earth metal or said rare-earth metal on a carrier, and the amount of the alkali metal, the alkali-earth metal or the rare-earth metal contained in the $NO_x$ absorbent located on an upstream side is more than 0.03 mol per 1 l of the volume of the carrier, the amount of the alkali metal, the alkali-earth metal or the rare-earth metal contained in the $NO_x$ absorbent located on a downstream side being less than 0.01 mol per 1 l of the volume of the carrier.

7. An exhaust purification device of an internal combustion engine according to claim 6, wherein the amount of the alkali metal, the alkali-earth metal or the rare-earth metal, contained in the $NO_x$ absorbent located on the upstream side, is between 0.1 mol and 0.3 mol per 1 l of the volume of the carrier.

8. An exhaust purification device of an internal combustion engine according to claim 6, wherein the carrier of the $NO_x$ absorbent is a single monolithic carrier.

9. An exhaust purification device of an internal combustion engine according to claim 8, wherein the amount of the alkali metal, the alkali-earth metal or the rare-earth metal, contained in a portion of the $NO_x$ absorbent, which is located in the most upstream side, is more than 0.03 mol per 1 l of the volume of the monolithic carrier, and the amount of the alkali metal, the alkali-earth metal or the rare-earth metal, contained in a portion of the $NO_x$ absorbent which is located in the most downstream side, is less than 0.01 mol per 1 l of the volume of the carrier, the amount of the alkali metal, the alkali-earth metal or the rare-earth metal, contained in the $NO_x$ absorbent, being gradually lowered from the portion of the $NO_x$ absorbent located on the most upstream side, toward the portion of the $NO_x$ absorbent located on the most downstream side.

10. An exhaust purification device of an internal combustion engine according to claim 6, wherein the carrier of the $NO_x$ absorbent is formed by a pair of monolithic carriers, comprising a monolithic carrier located on a upstream side and a monolithic carrier located on a downstream side.

11. An exhaust purification device of an internal combustion engine according to claim 6, wherein the carrier of the $NO_x$ absorbent is housed in a single casing.

12. An exhaust purification device of an internal combustion engine according to claim 1, wherein an exhaust gas continuously flows within the $NO_x$ absorbent during the time the engine is operated.

13. An exhaust purification device of an internal combustion engine according to claim 1, wherein the $NO_x$ absorbed in the $NO_x$ absorbent is released from the $NO_x$ absorbent by making the exhaust gas flowing into the $NO_x$ absorbent rich.

14. An exhaust purification device of an internal combustion engine according to claim 1, wherein the $NO_x$ absorbed in the $NO_x$ absorbent is released from the $NO_x$ absorbent by making the exhaust gas flowing into the $NO_x$ absorbent to be substantially the stoichiometric air-fuel ratio.

15. An exhaust purification device of an internal combustion engine according to claim 1, wherein air-fuel ratio control means is provided for controlling the air-fuel ratio of the air-fuel mixture formed in an engine combustion chamber, and the absorption of $NO_x$ into the $NO_x$ absorbent and the releasing of $NO_x$ from the $NO_x$ absorbent are controlled by controlling the air-fuel ratio of the air-fuel mixture formed in the engine combustion chamber by said air-fuel ratio control means.

16. An exhaust purification device of an internal combustion engine according to claim 15, wherein said air-fuel ratio control means makes the air-fuel ratio of the air-fuel mixture formed in the combustion chamber lean when the $NO_x$ should be absorbed into the $NO_x$ absorbent and makes the air-fuel ratio of the air-fuel mixture formed in the combustion chamber the stoichiometric air-fuel ratio or rich when the $NO_x$ should be released from the $NO_x$ absorbent.

17. An exhaust purification device of an internal combustion engine according to claim 16, wherein the internal combustion engine comprises a gasoline engine and said air-fuel ratio control means controls the absorption of $NO_x$ into the $NO_x$ absorbent and the releasing of $NO_x$ from the $NO_x$ absorbent by controlling the fuel amount supplied to the engine.

18. An exhaust purification device of an internal combustion engine according to claim 1, further comprising air-fuel ratio control means which controls the air-fuel ratio of the exhaust gas discharged from the engine combustion chamber and flowing into the $NO_x$ absorbent in the exhaust passage of the engine, and the absorption of $NO_x$ into the $NO_x$ absorbent and the releasing of $NO_x$ from the $NO_x$ absorbent are controlled by controlling the air-fuel ratio of the exhaust gas flowing into the $NO_x$ absorbent by said air-fuel ratio control means.

19. An exhaust purification device of an internal combustion engine according to claim 18, wherein said air-fuel ratio control means makes the air-fuel ratio of the exhaust gas flowing into the $NO_x$ absorbent lean when the $NO_x$ should be absorbed into the $NO_x$ absorbent, and makes the air-fuel ratio of the exhaust gas flowing into the $NO_x$ absorbent the stoichiometric air-fuel ratio or rich when the $NO_x$ should be released from the $NO_x$ absorbent.

20. An exhaust purification device of an internal combustion engine according to claim 19, wherein said air-fuel ratio control means supplies a reducing agent to the interior of the exhaust passage of the engine when the NO$_x$ should be released from the NO$_x$ absorbent.

21. An exhaust purification device of an internal combustion engine according to claim 20, wherein said reducing agent is made of a hydrocarbon.

22. An exhaust purification device of an internal combustion engine according to claim 21, wherein said hydrocarbon comprises at least one member selected from gasoline, isoctane, hexane, heptane, butane, propane, light oil, and kerosine.

23. An exhaust purification device of an internal combustion engine according to claim 1, further comprising NO$_x$ releasing control means which lowers the oxygen concentration in the exhaust gas flowing into the NO$_x$ absorbent only for a predetermined second set-up period so as to release the NO$_x$ from the NO$_x$ absorbent when the period for which the air-fuel ratio of the exhaust gas flowing into the NO$_x$ absorbent is made lean and the NO$_x$ is absorbed into the NO$_x$ absorbent exceeds a predetermined first set-up period.

24. An exhaust purification device of an internal combustion engine according to claim 23, wherein said NO$_x$ releasing control means makes the air-fuel ratio of the exhaust gas flowing into the NO$_x$ absorbent the stoichiometric air-fuel ratio or rich when the NO$_x$ should be released from the NO$_x$ absorbent.

25. An exhaust purification device of an internal combustion engine according to claim 23, wherein the said NO$_x$ releasing control means is provided with NO$_x$ amount estimation means for estimating the amount of NO$_x$ absorbed into the NO$_x$ absorbent, and said NO$_x$ releasing control means decides that said first set-up period has lapsed when the amount of NO$_x$ estimated by the NO$_x$ amount estimation means exceeds a predetermined set-up amount.

26. An exhaust purification device of an internal combustion engine according to claim 25, wherein said NO$_x$ amount estimation means decides that the amount of NO$_x$ absorbed in the NO$_x$ absorbent exceeds said set-up amount when a cumulative value of the engine speed exceeds a predetermined set-up value.

27. An exhaust purification device of an internal combustion engine according to claim 25, wherein said NO$_x$ amount estimation means decides that substantially all of the NO$_x$ absorbed in the NO$_x$ absorbent was released when the air-fuel ratio of the air-fuel mixture formed in the engine combustion chamber is maintained at the stoichiometric air-fuel ratio or is rich for a predetermined time or more.

28. An exhaust purification device of an internal combustion engine according to claim 23, wherein said second set-up period is substantially less than 20 seconds.

* * * * *

U NITED STATES PATENT AND TRADEMARK OFFICE
CERTIFICATE OF CORRECTION

PATENT NO. : 5,412,945
DATED : May 9, 1995
INVENTOR(S) : Kenji Katoh, et al.

It is certified that error appears in the above-indentified patent and that said Letters Patent is hereby corrected as shown below:

| Column | Line | |
|---|---|---|
| 2 | 62 | Change "TAU=TP.K" to --TAU=TP•K--. |
| 4 | 50 | After "acid" delete ",". |
| 5 | 28 | Change "NOx" to --$NO_x$--. |
| 6 | 36 | After "is made" insert --between 0.1 mol to 0.3 mol per 1 l of the volume of the monolithic carrier and, in the region d, the amount of at least one substance selected from alkali metals, alkali-earth metals or rare-earth metals is made--; change "per 1 of" to --per 1 l of--. |

UNITED STATES PATENT AND TRADEMARK OFFICE
CERTIFICATE OF CORRECTION

PATENT NO. : 5,412,945
DATED : May 9, 1995
INVENTOR(S) : Kenji Katoh, et al.

It is certified that error appears in the above-indentified patent and that said Letters Patent is hereby corrected as shown below:

| Column | Line | |
|---|---|---|
| 10 | 5 | Delete "this reduc-". |
| 10 | 6 | Delete "ing agent supply valve 23". |
| 10 | 11 | Change "isoctane" to --isooctane--. |
| 13 | 9 | Change "isoctane" to --isooctane--. |
| 11 | 68 | After "on" change "a" to --an--. |

Signed and Sealed this

Twenty-eighth Day of November 1995

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,412,945
DATED : May 9, 1995
INVENTOR(S) : Katoh, et al

It is certified that error appears in the above-indentified patent and that said Letters Patent is hereby corrected as shown below:

On the title page, item [73] Assignee should read
-- Kabushiki Kaisha Toyota Chuo Kenkyusho; Toyota
   Jidosha Kabushiki Kaisha, both of Aichi, Japan --

Signed and Sealed this

Fifth Day of March, 1996

*Attest:*

BRUCE LEHMAN

*Attesting Officer*     Commissioner of Patents and Trademarks